(12) United States Patent
Horst (10) Patent No.: US 12,468,826 B2
(45) Date of Patent: Nov. 11, 2025

(54) METHOD FOR OPERATING A PRINTING SYSTEM

(71) Applicant: Matthias Horst, Bochum (DE)

(72) Inventor: Matthias Horst, Bochum (DE)

(73) Assignee: Genius Bytes Software Solutions GmbH, Bochum (DE)

( * ) Notice: Subject to any disclaimer, the term of this patent is extended or adjusted under 35 U.S.C. 154(b) by 455 days.

(21) Appl. No.: 17/840,780

(22) Filed: Jun. 15, 2022

(65) Prior Publication Data

US 2022/0398329 A1 Dec. 15, 2022

(30) Foreign Application Priority Data

Jun. 15, 2021 (EP) .................................. 21179492

(51) Int. Cl.
*G06F 21/36* (2013.01)
*G06F 21/60* (2013.01)

(52) U.S. Cl.
CPC ............ *G06F 21/608* (2013.01); *G06F 21/36* (2013.01); *G06F 21/602* (2013.01)

(58) Field of Classification Search
CPC ...... G06F 21/608; G06F 21/36; G06F 21/602; G06F 3/1237; G06F 3/1238; G06F 3/124; G06F 3/1241; G06F 3/1244; G06F 3/1253; G06F 3/1259; G06F 3/126; G06F 3/1265; G06F 3/1267; G06F 3/1268; G06F 3/1273; G06F 3/1275; G06F 3/1293; G06F 3/1296; G06F 3/1297
See application file for complete search history.

(56) References Cited

U.S. PATENT DOCUMENTS

| | | | |
|---|---|---|---|
| 6,378,070 B1* | 4/2002 | Chan | G06F 21/608 380/255 |
| 6,385,728 B1* | 5/2002 | DeBry | G06F 21/608 709/229 |
| 7,305,556 B2* | 12/2007 | Slick | G06F 21/608 713/168 |
| 9,817,983 B2* | 11/2017 | Revel | H04W 12/033 |
| 11,314,877 B2* | 4/2022 | Laing | G06F 3/1292 |
| 2003/0081788 A1 | 5/2003 | Simpson et al. | |
| 2005/0163549 A1* | 7/2005 | Shima | G06F 21/608 400/62 |
| 2006/0136726 A1 | 6/2006 | Ragnet et al. | |
| 2008/0235512 A1* | 9/2008 | Minagawa | H04L 9/0822 713/171 |
| 2017/0017439 A1* | 1/2017 | Kang | H04W 12/00 |

FOREIGN PATENT DOCUMENTS

| | | |
|---|---|---|
| WO | WO 2018/115667 A1 | 6/2018 |
| WO | WO 2020/086088 A1 | 4/2020 |
| WO | WO 2021/054967 A1 | 3/2021 |

* cited by examiner

*Primary Examiner* — Benjamin E Lanier
*Assistant Examiner* — Rupali Dhakad
(74) *Attorney, Agent, or Firm* — Reinhart Boerner Van Deuren P.C.

(57) ABSTRACT

The application relates to a method for operating a printing system with a printing server and a printing device that can be connected to the printing server. The printing system is configured to obtain a print job encrypted with a public print job key from a computer connected to the printing server and to receive a private print job key encrypted with a public printing device key from a mobile user terminal. The received encrypted print job is subsequently sent to the printing device for printing.

15 Claims, 5 Drawing Sheets

Fig.7

METHOD FOR OPERATING A PRINTING SYSTEM

CROSS-REFERENCE TO RELATED PATENT APPLICATIONS

This patent application claims priority to European Patent Application No. 21179492.0, filed Jun. 15, 2021, the entire teachings and disclosures of which are incorporated herein by reference thereto.

FIELD OF THE INVENTION

The application relates to a method for (securely) operating a printing system. Furthermore, the application relates to a printing server, a printing device, a printing system and a printing application.

BACKGROUND OF THE INVENTION

Methods for operating printing systems and printing systems with at least one printing device which can be used by at least one computer device for printing a print job are known from the prior art.

Thus, a print job may be generated by the computer device. The generated print job may be transmitted to the at least one printing device via a wireless and/or wired communication network. Upon receipt of the print job, the printing device executes the print job, for example, prints a document or the like.

Typically, a printing system comprises at least one printing device, at least one printing server and a plurality of computer devices. The aforementioned elements are interconnectable with each other via a wireless and/or wired communication network.

A general problem of such printing systems is that documents printed by a printing device can also be readable by users who have no authorisation to do so. A (network) printing device can usually be used by a plurality of computer devices and/or users and, in particular, is located at a distance from the computer devices. If a print job (also called print order) is generated by a computer device operated by a first authorised user and transmitted to a printing device via the printing server for printing, the print job can be printed directly by the printing device. For example, due to the distance between the computer device that generated the print job and the printing device (but also for other reasons), the printed print job can often be viewed by unauthorised third parties.

In order to increase the security in such printing systems and, in particular, to prevent unauthorised third parties from accessing documents printed by a (network) printing device, according to the prior art user-related signature cards (also called smart cards) are used. In particular, a signature card with a secret key can be assigned to each user.

Figure 1:
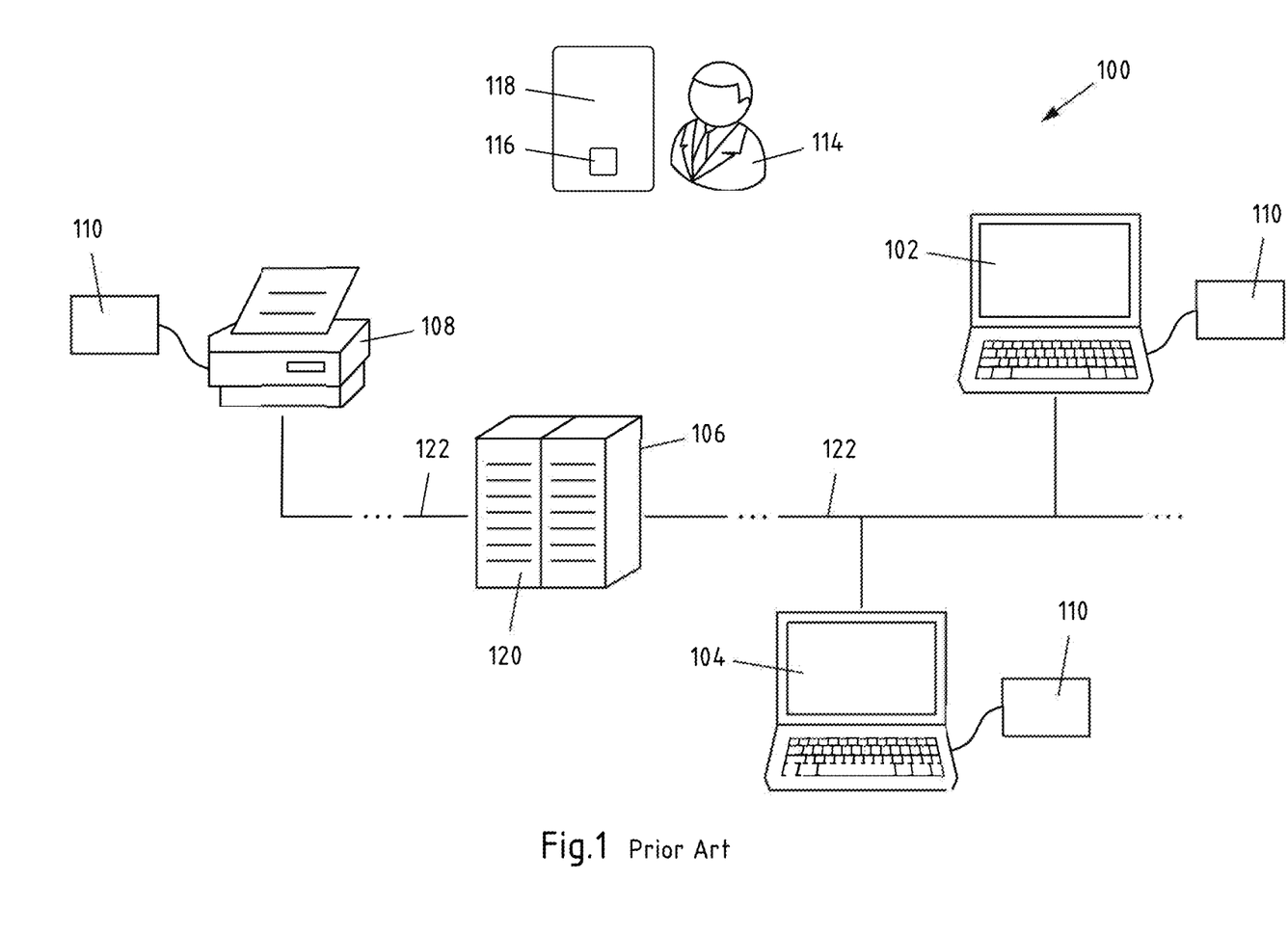
FIG. 1 is a schematic view of a printing system according to the prior art.

Such a prior art printing system 100 is shown in FIG. 1. The printing system 100 comprises a plurality of computer devices 102, 104, each comprising a card reader 110 and being connected to such a card reader 110, respectively.

For example, a user can create a document to be printed in a conventional manner using a computer device 102, 104. For a printing by the printing device 108 of the printing system, the print job containing the document to be printed is encrypted with the secret key (also called private key) of the user 114. This key is stored in a memory means 116 of the signature card 118 of the user and can be used by the card reader 110 of a computer device 102, 104 for encrypting.

The print job encrypted with the key is then sent to the printing server 106 of the printing system 100 via a wireless and/or wired communication network 122 and stored in a data memory 120 of the printing server 106.

In order to print the document in a secure manner, the printing device 108 comprises a further card reader 110. The encrypted print job can be transmitted from the printing server 106 to the printing device 108. The user holds his signature card in the card reader. The encrypted print job is then decrypted using the secret key of the user read at the printing device 108 by the card reader 110. The decrypted document is then read respectively printed by the printing device 108. This ensures that the authorised user is physically present at the printing device 108 when the printing process is carried out.

Such a printing system has the disadvantage that additional hardware is required. In addition to the plurality of card readers, each user must have a signature card.

In addition, the operation of such a system involves a great deal of effort, since, for example, the certificates of the signature cards have to be updated regularly. Revocation lists must be maintained to prevent revoked signature cards (which have been lost by a user, for example) from continuing to be usable.

Furthermore, the security is indeed improved. However, the security level of the printing system is comparatively low because the secret key used is only personal and user-related, respectively. If the key becomes known to an unauthorised third party, he or she can view printed jobs without authorisation.

Therefore, the object of the present application is to provide a method for operating a printing system which enables a printing of print jobs on a printing device of the printing system in a simple and at the same time secure manner.

BRIEF SUMMARY OF THE INVENTION

The object is solved in accordance with a first aspect by a method of the present embodiment. The method for operating a printing system, comprising at least one printing server and at least one printing device communicatively connectable to the printing server, comprises:

receiving, by the printing server, a print job encrypted with a public print job key of a print job key pair from a communicatively connectable computer device, receiving, by the printing server, a private print job key of the print job key pair encrypted with a public printing device key of a printing device key pair from a mobile user terminal, wherein the printing device key pair is associated with the printing device, transmitting, by the printing server, the received encrypted private print job key to the printing device, and transmitting, by the printing server, the received encrypted print job to the printing device for printing of the print job by the printing device.

By using, in contrast to the state of the art, according to the application, two (asynchronous) key pairs and, in particular, a mobile user terminal (of an authorised user) (which is usually provided anyway), the printing of print jobs can be carried out in a simple and at the same time secure manner at a printing device of the printing system. The use of card readers and signature cards can be omitted and thus the effort for such a security system.

The method serves for operating a printing system, at least one printing server of a printing system. A printing system comprises at least one printing server and at least one printing device communicatively connectable to the printing server. Preferably, the printing server can be communicatively connectable to the printing device via at least one communication network. The wireless and/or wired communication network may comprise at least one network, such as a Local Area Network (LAN), a Wireless LAN (WLAN), a Wide Area Network (WAN) and/or the like.

The at least one printing device of the printing system is preferably a network printer. A network printer may have a display, for example, in the form of a display. A network printer may comprise a processor, memory means, interfaces, etc. A printing device according to the application comprises at least one printing function, for example, in the form of a printing module. Further functions, such as a scanner function and/or a fax function, may be implemented.

A printing server may be formed by at least one computing device with server functionality and may include, in particular, a processor, memory means, interfaces, etc.

At least one computer device can be connected to the printing system, in particular, in the form of a (stationary) workstation and computer, respectively. In one embodiment, the printing system can comprise the at least one computer device.

According to the method according to the application, the printing server receives an encrypted print job. The print job can be generated, in particular, by at least one computer device connectable to the communication network.

In order to encrypt the print job and the print data, respectively, it is proposed to use an asynchronous encryption (also called public key encryption method). In such a cryptographic method, a key pair is provided consisting of a secret part (private key) and a non-secret part (public key). Basically, a public key allows anyone to encrypt data for the owner of the private key. The private key allows its owner to decrypt data encrypted with the public key.

According to the application, a print job is encrypted with a public print job key of an (asynchronous) print job key pair. This encrypted print job is received by the printing server from the computer device. In particular, the computer device may have sent the encrypted print job.

In order to enable secure printing of the print job by the printing device, it is proposed according to the application to transmit the encrypted print job to the printing device, in particular to enable decryption of the print job by the printing device. For this purpose, it is necessary to also provide the private print job key of the print job key pair to the printing device.

In order to transmit the private print job key to the printing device in a secure manner, it is proposed according to the application to transmit it to the printing device in encrypted form. According to the application, it is proposed, in particular, to use an asynchronous encryption method for the encrypting of the private print job key of the print job key pair.

According to the application, it is provided that the printing server receives the private print job key of the print job key pair encrypted with a public printing device key of an (asynchronous) printing device key pair from a mobile user terminal (of the authorised user). According to the application, the printing device key pair is (uniquely) assigned to the printing device to be used.

In particular, this means that the public printing device key is provided to a mobile user terminal at the printing device and the associated private printing device key is stored in the printing device. Providing a public printing device key at the printing device means in particular that a mobile user terminal can only receive this public printing device key if it (and thus the user) is in immediate (physical) proximity (e.g. at least closer than 5 m, preferably at least closer than 1 m, and/or preferably in the room in which the printing device is located) to the printing device.

The private print job key may be stored in a data memory of the mobile user terminal. This private print job key can be encrypted using the public printing device key. The encrypted private print job key may be sent. In other words, the printing server may receive a print job private key encrypted with a printing device public key of a printing device key pair from a mobile user terminal.

According to the application, the encrypted private print job key and the encrypted print job are transmitted so that the printing device is enabled to decrypt the print job. In a variant of the application, the encrypted private print job key is transmitted first. After decryption of the encrypted private print job key, the associated encrypted print job may be requested. In response to this request, the associated encrypted print job can be transmitted.

Printing a document or the like can be made possible in a particularly secure manner. According to the application, both print-order-specific and print-device-specific encryption takes place. This increases the security compared to the prior art.

In one embodiment, the printing server can be integrated in the printing device. In this case, communicatively connectable means in particular an internal communication connection between the printing server and the printing device.

Further, the printing server may be a distributedly arranged printing server. For example, the printing server may be formed by two distributed printing server components. In particular, a first printing server component may be arranged to receive the print job encrypted with a public print job key of a print job key pair from a computer device communicatively connectable to the printing server arrangement. The first printing server component may be configured to transmit the received encrypted print job to the printing device for further processing of the print job by the printing device. The first printing server component may be implemented in the printing device or the computer device or an additional computer device. In particular, the first printing server component may perform respectively control all steps (e.g., receiving, storing, sending or providing, etc.) related to the print job.

A second printing server component (particularly located remotely from the first printing server component) may be configured to obtain a private print job key of the print job key pair encrypted with a public printing device key of a printing device key pair from a mobile user terminal. The second printing server component may be configured to transmit the received encrypted private print job key to the printing device. The second printing server component may be implemented in the printing device or the computer device or an additional computing device. In particular, the second printing server component may perform respectively control all steps (e.g., obtaining, sending or providing, etc.) involving the encrypted private print job key.

According to a further embodiment of the method according to the application the private printing device key of the printing device key pair may be stored in a data memory of the printing device. The method may comprise:

(locally) decrypting, by the printing device, of the received encrypted private print job key with the stored private printing device key of the printing device key pair, and in particular (locally) decrypting, by the printing device, the received encrypted print job with the decrypted private print job key.

In other words, the printing device (in particular, a decryption module of the printing device set up accordingly) first decrypts the private print job key encrypted with the public printing device key of the printing device key pair by using the private printing device key of this printing device key pair. The private printing device key may, in particular, be stored in a (secured) data memory of the printing device.

Subsequently (for example, after the associated encrypted print job has been received in response to a corresponding request), the printing device (in particular, a decryption module of the printing device set up accordingly) can decrypt the print job encrypted with the public print job key of the print job key pair by using the decrypted private print job key from this print job key pair.

Preferably, after a decrypting, according to a further embodiment of the method, a printing of the decrypted print job can be performed by the printing device. In particular, printing process can take place immediately after the (successful) decryption of the print job.

According to a preferred embodiment of the method according to the application, the method may comprise:
  providing (in particular, generating), by the computer device, the print job key pair, in particular, upon a creation of the print job,
  encrypting the print job with the public print job key of the provided print job key pair,
  causing, by the computer device, a transmitting of the encrypted print job to the printing server (and/or the printing device), and
  providing, by the computer device, the private print job key of the provided print job key pair at the computer device such that the mobile user terminal can obtain the private print job key (only (directly) at the computer device).

In particular, a print job key pair can be provided during or after the (conventional) creation of a print job by the computer device. For example, a user can cause a document (e.g. text, image, etc.) to be printed by actuating a user interface in a conventional manner. Then, the computer device (in particular, an appropriately configured encryption module of the computer device) may encrypt the print job with the provided public print job key. The encrypted print job may be transmitted to the printing server by the computer device. In other words, the printing server may receive the print job from the computer device in the manner described above.

In order to enable a transmitting of the private print job key in a simple and secure manner, the private print job key can be provided to the mobile user terminal by the computer device, in particular, at the computer device, so that the mobile user terminal can receive the private print job key at the computer device. Providing a private print job key at the computer device means, in particular, that a mobile user terminal can receive this private print job key only if it is in close (physical) proximity (e.g. at least closer than 5 m, preferably at least closer than 1 m; preferably in the same room as the computer device) to the computer device.

In particular, the user who created the print job on the computer device may have the mobile user terminal. In other words, the mobile user terminal may be (uniquely) associated with the authorised user.

In general, the transmitting of the private print job key can be done in any way, as long as it is ensured that the mobile user terminal must be at the computer device to receive it. This can further increase the security.

According to a particularly preferred embodiment of the method according to the application, providing, by the computer device, the private print job key of the provided print job key pair may comprise displaying an optical print job code by an optical display (and screen, respectively) of the computer device. The optical print job code may preferably include the private print job key. By displaying the private print job key in an encoded manner, the security can be enhanced in a simple manner. For example, the optical print job code may be a barcode, such as a QR code, 2D barcode and/or the like.

The optical print job code may be detected by an optical detection module of the mobile user terminal. In particular, the optical detection module may be a camera (with an image processing module). In order to detect the print job code, it is in particular necessary that the mobile user terminal is in the immediate proximity (e.g. less than 5 m, preferably less than 1 m) to the computer device.

Preferably, the private print job key can be extracted from the print job code. In particular, the private print job key extracted from the optical print job code can be stored in a (secure) data memory of the mobile user terminal. For example, the private print job key may be stored in an encrypted form in the data memory of the mobile user terminal.

Alternatively or additionally, the private print job key may be transmitted via a near field communication link that can be established between the mobile user terminal and the computer device. Non-exhaustive examples include RFID connection, an NFC connection and a Bluetooth connection. In still other variants, a wired transmission may also be used.

According to a further embodiment of the method according to the application, the private print job key of the provided print job key pair may be deleted on (or in) (and in particular by) the computer device after a receipt of the private print job key by the mobile user terminal. By deleting the private print job key when it is present on the mobile user terminal, the security can be further enhanced. In particular, it can be avoided that the print job key is in multiple locations at the same time. Upon a deletion on the computer device, it can no longer be captured from the computer device by unauthorised users.

According to an embodiment of the method according to the application, the deletion after a receipt by the mobile user terminal can comprise a deletion of the private print job key at the end of a predetermined time period after the start of the displaying of the optical print job code. In this embodiment, it is assumed, in particular, that the mobile user terminal has received the optical print job code within the predetermined time period (e.g. between 5 s and 5 min, preferably between 10 s and 30 s), i.e. in particular has scanned it. If this has not been the case, it may be necessary to regenerate the key pair.

Alternatively or additionally, the deletion of the private print job key may occur upon receipt, by the computer device, of a confirmation message. The confirmation message may confirm the receipt of the private print job key by the mobile user terminal. For example, the mobile user terminal may transmit a corresponding confirmation message after (successfully) storing the received private print job key. The transmission can also be performed by a user action on the mobile user terminal. In this way, the user can actively confirm the successful detection and trigger a transmission herewith.

Preferably, a printing application in the form of an installable computer program (in particular a so-called "app") can be provided on the mobile user terminal, which is executable and is executed, respectively, by a processor of the mobile user terminal. The print application can, in particular, control the process steps that can be carried out by the mobile user terminal, as will be described in more detail.

Furthermore, the optical print job code may contain at least one further print job datum, in particular, selected from the group, comprising:
    print job identifier (identifier generated for the print job),
    computer device identifier (for example, a unique code or (network) address),
    user identifier (in particular, of the user of the computer device and/or the user terminal),
    printing device identifier of the selected printing device (for example, a unique code) and/or a unique (network) address of the selected printing device,
    time date (for example, a print job generation timestamp).

It shall be understood that two or more of the aforementioned print job data may be included. At least one of these print job data (more than one may also be combined) may be used as a print identifier, as will be described in more detail.

In order to further increase the security, according to a further embodiment of the method according to the application, providing the print job key pair can comprise generating a new print job key pair for each (newly) created print job. In particular, the computer device (in particular, an appropriately configured key generator) can generate a new print job key pair for each created print job.

In other variants, a key pair can have a temporal validity (e.g. between 1 h and 72 h). Alternatively or additionally, it can be provided that a key pair is only valid for a certain number of print jobs (e.g. between 2 and 20 print jobs). When the validity expires, a new key pair can be generated.

In further variants, the key generator may be implemented in a further computing device of the printing system and transmit a generated key pair to the computer device (for example, via an encrypted communication link in response to a request by the computer device).

As described above, according to a preferred embodiment of the method according to the application, the method may comprise:
    providing, by the printing device, the public printing device key of the provided printing device key pair such that the mobile user terminal can obtain the public printing device key (only) at the printing device, and
    storing the private printing device key of the provided printing device key pair in a (secure) data memory of the printing device.

According to a further embodiment of the method according to the application, providing, by the printing device, the public printing device key of the provided printing device key pair may comprise displaying an optical printing device code. The optical printing device code may include the public printing device key.

The optical printing device code (preferably a barcode, such as a QR and/or 2D barcode) can be detected by an optical detection module of the mobile user terminal. In particular, the optical detection module may be a camera (with an image processing module). In order to detect the printing device code, it is in particular necessary for the mobile user terminal to be in close proximity (less than 5 m, preferably less than 1 m) to the printing device.

Alternatively, a near field communication link can also be used here. Non-exhaustive examples are an RFID connection, an NFC connection and a Bluetooth connection. In still other variants, a wired transmission can also be used.

The optical printing device code may contain at least one further printing device datum, such as a printing device identifier.

According to a further embodiment of the method according to the application, the public printing device key can be a static or permanently valid public printing device key. In particular, the optical printing device code can be a static or permanently valid public printing device code, for example, in the form of a printing device code (e.g. a barcode) permanently attached to a (visible) outer wall and outer side, respectively, of the printing device. For example, this printing device code can be imprinted.

As described above, the optical printing device code may be detected by an optical detection module of the mobile user terminal. The stored private print job key can, according to a further embodiment of the method according to the application, be encrypted by the mobile user terminal with the public print job key (contained in the detected print job code). In particular, this can be done immediately after the detection.

The encrypted private print job key may be transmitted, by the mobile user terminal, to the printing server (via the at least one communication network). Preferably, the transmission can take place immediately after the encryption of the private print job key. In particular, the transmitting may be a print request message at the same time. In particular, by immediately performing the encryption and transmission it can be ensured that the authorised user is still (actually) at the printing device when the print job is printed.

According to a further preferred embodiment of the method according to the application, obtaining, by the printing server, the encrypted print job may comprise obtaining a first print identifier. The obtaining, by the printing server, the encrypted private print job key may comprise obtaining a further print identifier. The transmitting of the received encrypted print job to the printing device and the received encrypted private print job key to the printing device may be based on the first print identifier and the further print identifier. In particular, the print identifier may be a datum that allows the print job to be associated with the associated private print job key in a particularly unique manner. For example, the first and the further print identifier can each be a (system-wide unique) print job identifier and/or a (system-wide unique) user identifier and/or a (system-wide unique) time date. It shall be understood that other identifiers can also be used as print identifiers.

The computer device may send the first print identifier along with the encrypted print job. Further, the computer device may provide the further print identifier together with the private print job key to the mobile user terminal. For example, the further print identifier may be incorporated into the print job code when the print job code is generated. The further print identifier can also be transmitted via a near field communication link.

As has already been described, the first and further print identifiers (which are in particular identical) can enable a mapping between print job and associated encrypted private print job key.

In a preferred variant of the application, the encrypted private print job key with the (preferably also encrypted) further print identifier can first be sent to the printing device. Then (if the decryption is successful) the (decrypted) further print identifier can be sent to the printing server by the printing device in the form of a request message. In response, the associated encrypted print job, determinable by the associated first print identifier, can be sent to the requesting printing device by the printing server.

According to a further embodiment of the method according to the application, the method may comprise storing, by the printing server, the received encrypted print job together with the received first print identifier in a data memory of the printing server.

Since the computer device that creates the print job is usually located remotely from the printing device, the initially received print job data set containing at least the first print identifier and the encrypted print job can be stored in a (secure) data memory (for example, encrypted). Upon receipt of a print request message from the printing device, containing, in particular, the further print identifier, or a print request message from the mobile user terminal, containing, in particular, the further print identifier and the encrypted private print job key, the stored print job can be determined and, in particular, forwarded to the printing device. The determination can be based, in particular, on the association between the first and further identifier to a particular print job.

Preferably, the method may further comprise:

comparing a received further print identifier with the at least one stored first print identifier, and transmitting, if a correspondence (in particular, identity) between the received further print identifier and a stored first print identifier is determined in the comparing step, the stored encrypted print job with the first print identifier corresponding to the received further print identifier (and, if not yet done, the received encrypted private print job key with the further print identifier) to the printing device.

If no correspondence is detected, no print job is transmitted. In variants, a (standard) message can be sent to the mobile user terminal that no print job could be determined.

In particular, if an identity between the received further print identifier and an already stored first print identifier is determined, this can trigger the transmitting of the corresponding data to the printing device. The comparing and, if necessary, transmitting can take place, in particular, immediately after receipt of the further identifier.

A further aspect of the application is a printing server for a printing system. The printing server comprises at least one receiving module (in particular, a communication interface for connecting to a communication network) configured to receive a print job encrypted with a public print job key of a print job key pair from a computer device. The at least one receiving module is configured to receive a private print job key of the print job key pair encrypted with a public printing device key of a printing device key pair from a mobile user terminal. The printing device key pair is associated with the printing device. The printing server comprises at least one transmitting module (in particular, a communication interface for connecting to a communication network) configured to transmit the received encrypted print job to a printing device for printing the print job by the printing device. The at least one transmitting module is configured to transmit the received encrypted private print job key to the printing device.

The printing server can be operated, in particular, with the method described above. The printing server can comprise, as described, a data memory for storing print job data sets, each containing an encrypted print job and, in particular, an associated first print identifier.

Further, according to a further embodiment, the printing server may comprise a determination module configured to compare a received further print identifier with the at least one stored print identifier. When a correspondence is determined by the comparison, a transmitting of the corresponding data may occur, as described earlier.

A further subject matter of the application is a printing device for a printing system. The printing device comprises at least one key pair providing unit configured to provide a printing device key pair comprising a private printing device key and a public printing device key. The printing device comprises at least one data memory for storing the private printing device key of the provided printing device key pair. The key pair providing unit is configured to provide the public printing device key of the provided printing device key pair such that the mobile user terminal can receive the public printing device key at the printing device. The printing device comprises at least one receiving module (in particular, a communication interface for connecting to a communication network) configured to receive a print job encrypted with a public print job key of a print job key pair from a printing server, in particular, a previously described printing server. The receiving module is configured to receive a private print job key of a print job key pair encrypted with the provided public printing device key from a mobile user terminal (via the printing server). The printing device comprises at least one decryption module configured to decrypt the received encrypted private print job key with the stored private printing device key of the printing device key pair. The decryption module is configured to decrypt the received encrypted print job with the decrypted private print job key.

In particular, the printing device can be operated at least partially by the method described above. A corresponding method can be a stand-alone aspect of the application.

According to one embodiment of the printing device according to the application, the printing device may comprise a printing module configured to print the decrypted print job.

A further aspect of the application is a printing system. The printing system comprises at least one previously described printing server. The printing system comprises at least one printing device communicatively connectable to the printing server, in particular, a previously described printing device.

Preferably, the printing system may comprise at least one mobile user terminal with a printing application installed on the user terminal. Further, the printing system may comprise at least one previously described computer device.

It shall be understood that a printing system may comprise two or more printing servers and/or two or more printing devices and/or two or more mobile user terminals and/or two or more computer devices.

A further aspect of the application is a printing application in the form of a computer program installable on a mobile user terminal with computer code executable by a processor of the mobile user terminal. The printing application comprises at least one receiving module configured to receive a private print job key of a print job key pair provided by a computer device, wherein a print job is encryptable by the computer device with a public print job key of the print job key pair. The printing application comprises at least one storing module configured to store the received private print job key in a data memory of the mobile user terminal. The receiving module is configured to receive a public printing device key of a printing device key pair provided by a printing device at the printing device. The printing application comprises at least one encryption module configured to encrypt the stored private print job key with the received public printing device key. The printing application comprises at least one transmitting module configured to cause a transmitting of the encrypted private print job key by a communication module of the mobile user terminal.

The mentioned modules of the print application are, in particular, software modules executable by a processor.

The print application in the form of a computer program, in particular, the instructions or program instructions, may be stored in a computer program product, in particular, a program memory. For example, a program memory is a non-volatile memory such as a flash memory, a magnetic memory, an EEPROM memory (electrically erasable programmable read-only memory) and/or an optical memory.

In addition, a mobile user terminal may have a main memory, for example a volatile or non-volatile memory, in particular a random access memory (RAM), such as a static RAM memory (SRAM), a dynamic RAM memory (DRAM), a ferroelectric RAM memory (FeRAM) and/or a magnetic RAM memory (MRAM). For example, the processor of the user terminal may store intermediate results or the like in the main memory.

According to a preferred embodiment of the printing application according to the application, the transmitting module may be configured to cause a transmitting of a confirmation message upon receipt of the private print job key, in particular, after a (successful) storage of the private print job key in the data memory of the mobile user terminal.

A still further aspect of the application is a mobile user terminal with a printing application previously described installed on the mobile user terminal.

Exemplary and non-exhaustive mobile user terminals here are smartphones, tablet computers, mobile game consoles, laptops, netbooks, data glasses, smart watches and similar wearables.

A module, element, etc. described above may comprise at least partial hardware elements (e.g. processor, memory means, etc.) and/or at least partial software elements (e.g. executable code).

The features of the methods, printing servers, printing devices, printing systems, mobile user terminals and printing applications can be freely combined with each other. In particular, features of the description and/or the dependent claims may be independently inventive, even by completely or partially circumventing features of the independent claims, alone or freely combined with each other.

BRIEF DESCRIPTION OF THE DRAWINGS

There is now a plurality of possibilities for designing and further developing the methods according to the application, the printing server according to the application, the printing device according to the application, the printing application according to the application, the printing system according to the application and the mobile user terminal according to the application. For this purpose, reference is made on the one hand to the patent claims subordinate to the independent patent claims, and on the other hand to the description of embodiments in connection with the drawing. The drawing shows:

Similar reference signs are used for at least similar elements.

DETAILED DESCRIPTION OF THE INVENTION

Figure 2:
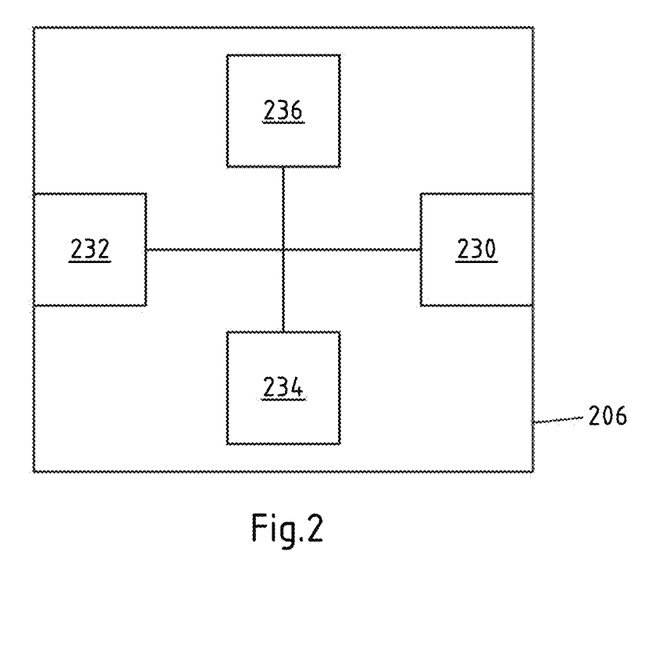
FIG. 2 is a schematic view of an embodiment of a printing server according to the present application.

FIG. 2 shows a schematic view of an embodiment of a printing server 206 according to the present application. The printing server 206 can be used, in particular, in a printing system.

The printing server 206 may, in particular, be formed by at least one computing device with at least one processor and memory means. In variants of the application, a printing server may be integrated in a printing device, in particular, in a printing device according to the present application.

The illustrated printing server 206 comprises a receiving module 230, a transmitting module 232, a data memory 234 and a determination module 236. The receiving module 230 and the transmitting module 232 may be formed by a bidirectional communication module. It shall be understood that other modules and/or further modules may be provided in other variants.

The receiving module 230 may, in particular, comprise at least one communication interface for connecting to a communication network. The transmitting module 232 may, in particular, comprise at least one communication interface for connecting to a communication network (or an internal connection to a receiving module of a printing device in which the printing server is integrated in this case).

It shall be understood that two or more communication interfaces can be provided in each case, in particular, for a corresponding number of different networks (e.g. LAN, WLAN etc.).

The at least one receiving module 230 is configured at least to receive a print job encrypted with a public print job key of a print job key pair from a computer device. The received encrypted print job can preferably be stored in the data memory 234 of the printing server (temporarily, for example for a predetermined maximum time period (e.g. 1 h to 72 h)). After this time period has elapsed, the job can be deleted. In particular, a print job data set may be received and obtained, respectively, containing the encrypted print job and preferably a unique first print identifier. This data set may be stored in the searchable data memory.

Further, the at least one receiving module 230 may be configured to receive a private print job key of the print job key pair encrypted with a public printing device key of a printing device key pair from a mobile user terminal. The printing device key pair is (uniquely) associated with the printing device to be used for the printing operation.

In particular, a key data set can be received and obtained, respectively, containing the encrypted private print job key and preferably a unique further print identifier corresponding to, in particular identical to, the first print identifier.

In particular, immediately upon receipt of a key data set (or immediately upon receipt of a request message from the printing device, wherein the request message may include at least the further print identifier), the determination module 236 may compare the further print identifier with the at least one stored first print identifier. If a correspondence, preferably identity, between the further print identifier and the first print identifier is determined by the determination module 236, the determination module 236 may cause the transmitting of the corresponding data set (or, in the case of a request message, only the print job data set) by the transmitting module 232.

Alternatively, the transmitting module can forward a key data set to the printing device immediately upon receipt of the key data set. In this case, preferably the further print identifier may also be encrypted by the public printing device key. After a decryption, the printing device can (directly) send the request message and, in a corresponding manner, the printing server can receive this request message. As has been described, the associated print job data set can then be determined and sent.

The at least one transmitting module 232 is configured to transmit the received encrypted print job to a printing device for printing of the print job by the printing device as has been described. It should be noted that a print job data set may include address data and/or a printing device identifier.

The at least one transmitting module 232 is further configured to transmit the received encrypted private print job key to the printing device, as has been described. It should be noted that a print job data set may include address data and/or a printing device identifier.

Figure 3:
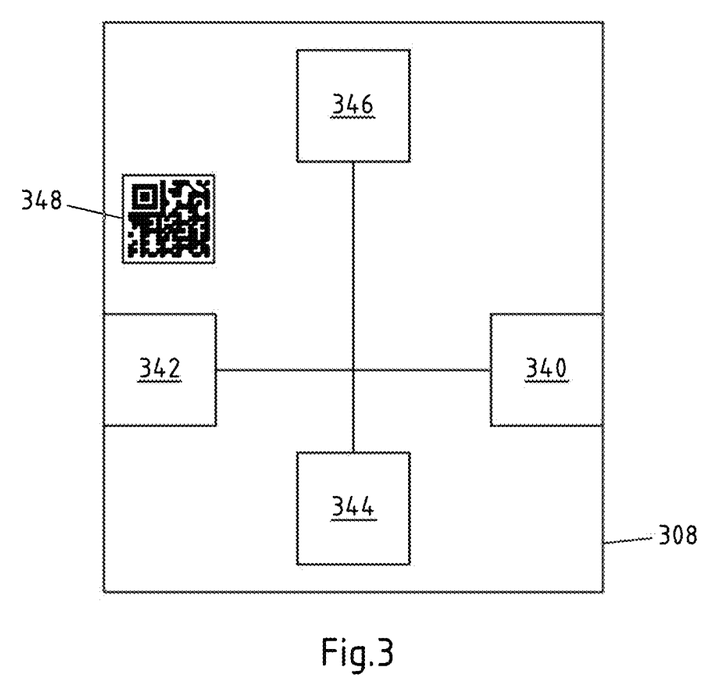
FIG. 3 is a schematic view of an embodiment of a printing device according to the present application.

FIG. 3 shows a schematic view of an embodiment of a printing device 308 according to the present application. The printing device 308 can, in particular, be used in a printing system.

In particular, the printing device 308 may comprise at least one processor and memory means. In variants of the application, the printing device may comprise a pre-described printing server.

The printing device 308 is a network printer 308 having at least one printing functionality. It is understood that further functionalities (e.g. scanner functionality, fax functionality) may be implemented in a printing device.

The illustrated printing device 308 comprises a receiving module 340, a key pair providing unit 348, a (secure) data store 342, a decryption module 344, and a printing module 346.

The printing module 346 is conventionally configured to print a print job, in particular on a printable medium (e.g. paper).

A receiving module 340 may, in particular, comprise at least one communication interface for connecting to a communication network (or an internal connection to a transmitting module of a printing server, which in this case is integrated in the printing device). It shall be understood that two or more communication interfaces may each be provided, in particular, for a corresponding number of different networks (e.g. LAN, WLAN, etc.).

The at least one key pair providing unit 348 is configured to provide a printing device key pair including a private printing device key and a public printing device key. The at least one data memory 342 is configured to store the private printing device key of the provided printing device key pair.

The key pair providing unit 348 is further configured to provide the public printing device key of the provided printing device key pair such that the mobile user terminal can obtain the public printing device key (only) at the printing device 308. In the present embodiment, this is implemented by arranging an optical printing device code 348 (for example a barcode, in particular, a QR and/or 2D barcode) on a visible outer side of the printing device 308.

For example, the printing device code 348 may be imprinted on the exterior of the printing device 308, or a sticker to which the printing device code 348 is applied may be adhered to an outer side. In variants of the application, the printing device code 348 may also be displayed by a display (not shown) of the printing device 308 (for example, upon a manual request by a user).

Such a printing device code 348 may be captured respectively detected by an optical detecting unit of a mobile user terminal. The printing device code 348 includes at least the public printing device key. Further data, such as a printing device identifier and/or address data of the printing device 308, may be included.

The at least one receiving module 340 is configured to receive a print job encrypted with a public print job key of a print job key pair from a printing server, for example a printing server 206 according to the embodiment of FIG. 2.

The at least one receiving module 340 is further configured to receive a private print job key of a print job key pair encrypted with the provided public printing device key from a mobile user terminal, preferably via the printing server. In particular, the encrypted print job and the encrypted private print job key can be received almost simultaneously. It is also conceivable that a common data set is received. Also, as has been described, only the encrypted key data set can be received first and then, in response to a corresponding request message, the encrypted print job.

Optionally, the first and the further print identifier can be provided to enable an association of print job and private print job key in an analogous manner as described before.

The at least one decryption module 344 is configured to decrypt the received encrypted private print job key with the stored private printing device key of the printing device key pair. In particular, the decryption module 344 may access the data memory 342 and apply the private printing device key stored therein to the received encrypted private print job key.

As described, upon the decrypting, a request message can be sent by a transmitting module (not shown) to request the associated print job.

The decryption module 344 is further configured to decrypt the received encrypted print job using the decrypted private print job key. The decrypted print job and data, respectively, is then provided to the printing module 346 for printing.

Figure 4:
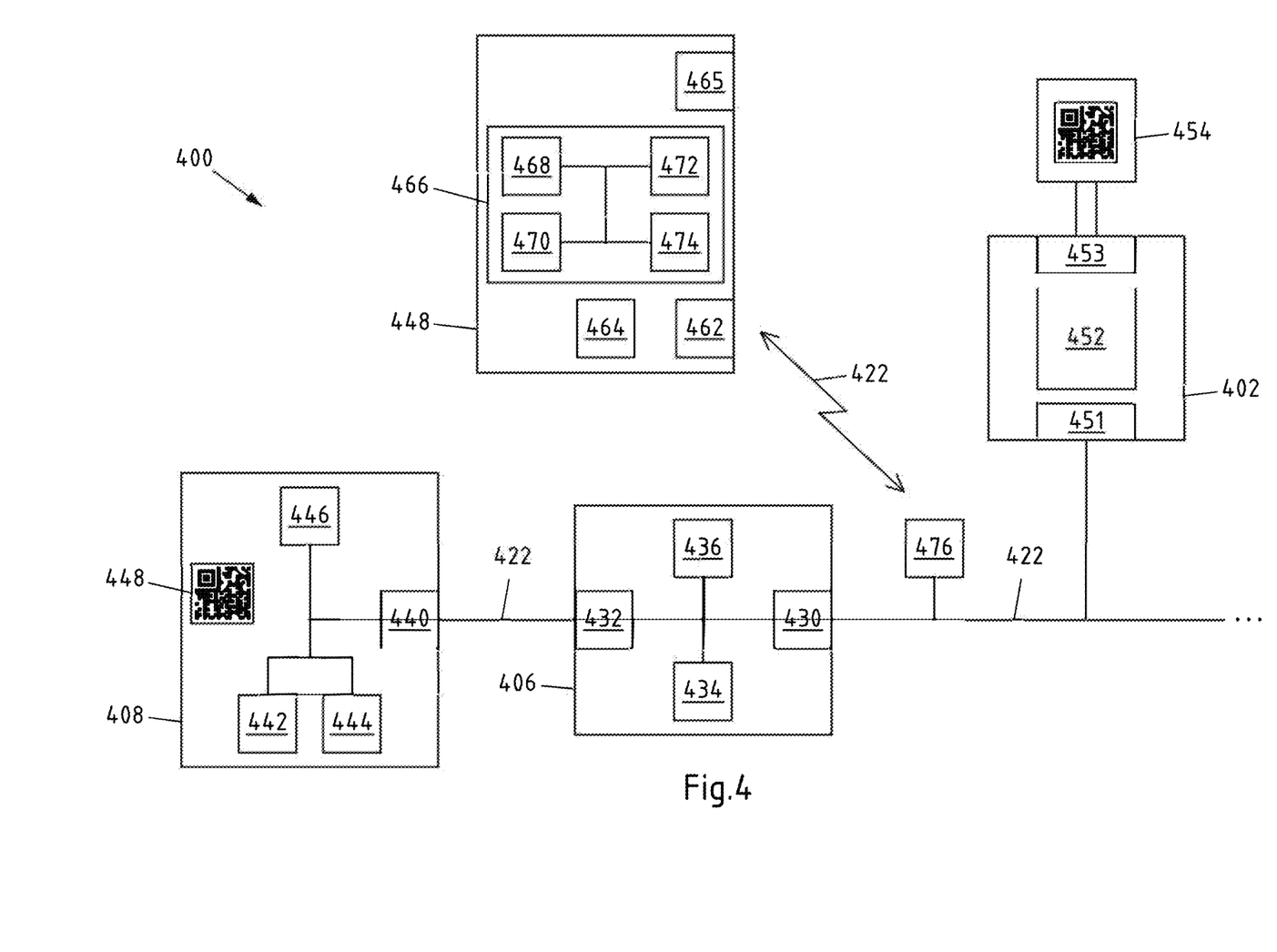
FIG. 4 is a schematic view of an embodiment of a printing system according to the present application and an embodiment of a printing application according to the present application.

FIG. 4 shows a schematic view of an embodiment of a printing system 400 according to the present application and an embodiment of a printing application 466 in the form of an executable computer program 466. The printing system 400, in particular, a network printing system 400, may be implemented, in particular, in an office building.

The printing system 400 comprises a printing device 408 and a printing server 406 communicatively connected to the printing device 408. Presently, a (wireless and/or wired) communication network 422 is provided. As already described, in variants of the application the printing server may also be integrated in the printing device.

The at least one printing device 408 can, in particular, be formed in accordance with the printing device according to FIG. 3, so that in order to avoid repetitions, reference is made below essentially to the explanations for FIG. 3.

The at least one printing server 406 can, in particular, be formed in accordance with the printing server according to FIG. 2, so that in order to avoid repetitions, reference is made below essentially to the explanations for FIG. 2.

As can further be seen, at least one mobile user terminal 458 (for example, a smartphone) and at least one (at least temporarily stationary) computer device 402 in the form of a workstation computer 402 are provided.

Preferably, a plurality of mobile user terminals 458 and/or a plurality of computer devices may be provided. A plurality of computer devices may use the printing device 408 for printing as a network resource. Preferably, the printing system 400 may comprise the at least one mobile user terminal 458 and/or the at least one computer device 402.

The at least one computer device 402 may be communicatively connectable to the printing server 406 and the printing device 408 via the communication network 422 via a communication module 451. The printing system 400 may comprise the communication network 422.

The computer device 402 may comprise a display 454 in the form of a display 454 and screen 454, respectively. A user (not shown in favor of a better overview) may create a print job through the computer device 402 in a conventional manner.

The illustrated computer device 402 comprises a providing module 452 for providing the print job key pair, in particular, upon a creation of the print job. Preferably, the providing module 452 may be a key generation module 452 configured to generate the (asynchronous) print job key pair. Preferably, the key generation module 452 may generate a new print job key pair for each created print job (may also be referred to as a session key pair). As described above, in other variations of the application, a print job key pair may also be usable and valid, respectively, for a plurality of print jobs.

The computer device 402 may comprise an encryption module 453 configured to encrypt at least the print job with the public print job key of the provided, in particular, generated print job key pair. In other words, the print data can be encrypted using the generated public print job key. In particular, this also comprise encrypting the print job with a synchronous key (which is also known to the printing server, for example) and subsequently encrypting only the synchronous key with the public print job key. This can be particularly advantageous with regard to the required computing time and/or the amount of data to be transmitted. Optionally, a first print identifier (which is uniquely assigned to the print job) can also be encrypted.

After an encrypting the print job, the communication module 451 of the computer device 402 can transmit the encrypted print job to the printing server 406, in particular, via the communication network 422. In particular, a print job data set can be transmitted containing at least the print job and the described first print identifier.

Further, providing, by the computer device 402, the private print job key of the provided print job key pair may be such that the mobile user terminal 458 may obtain the private print job key (only) at the computer device 402. In particular, this means that a user terminal located remotely (e.g. outside the room in which the computer device is located and/or at a distance greater than 5 m, preferably 1 m, and/or in the room in which the computer device is located) from the computer device 402 cannot detect the private print job key.

In particular, providing the private print job key of the provided print job key pair in the present embodiment comprises displaying an optical print job code 456 by the optical display 454 of the computer device 402. The optical print job code 456 (preferably a barcode, such as a QR code) comprises, in particular, the private print job key. As has already been described, in other variants of the application, the provision may be made via a near field communication link.

Preferably, the print job code 456 can comprise further data, in particular, at least the described further print identifier (which is preferably identical to the first print identifier and is also uniquely assigned to the print job). Such a print job code 456 can be detected and scanned, respectively, by an optical detecting unit 465 (in particular, a camera 465) of the mobile user terminal 458.

As shown schematically, a printing application 466 is installed on the mobile user terminal 458, in particular, in the form of an "app". The illustrated print application 466 comprises a plurality of software modules 468, 470, 472 and 474 executable by a processor of the mobile user terminal 458. The modules 468, 470, 472 and 474 may interact, at least in part, with modules 465, 462 and 464 of the mobile user terminal 458.

The print application 466 comprises at least one receiving module 468 configured to receive the private print job key of a print job key pair provided by the computer device 402. In this example, the receiving module 468 can receive the print job code detected by the camera 465 and extract, for example, the private print job key contained in the code.

Further, the print application 466 may comprise at least one storing module 470 configured to store the received private print job key in a (secure) data memory 464 of the mobile user terminal 458.

In addition, the receiving module 468 is, in particular, configured to obtain a public printing device key of a printing device key pair provided by the printing device 408 at the printing device 408. Presently, the receiving module 468 may receive the printing device code detected by the camera 465 and extract, for example, the public printing device key contained in that code.

The print application 466 comprises at least one encryption module 472 configured to encrypt the stored private print job key with the received public printing device key. In particular, upon receipt of the public printing device key, the stored private printing device key may be encrypted, in particular, immediately.

Further, the printing application 466 comprises at least one transmitting module 474 configured to cause the encrypted private print job key to be transmitted by a communication module 462 of the mobile user terminal 458. In particular, the mobile user terminal 458 may be connectable and connected, respectively, to the communication network 422 via the communication module 462 (for example, comprising a WLAN interface or the like). As can be seen, a wireless channel with a communication device 476 (for example, a WLAN node coupled to the wired network) may be used for communication.

In particular, the transmitting module 474 is further configured to cause the communication module 462 of the mobile user terminal 458 to transmit a confirmation message upon receipt of the private print job key. For example, upon detection of a successful storing of the private print job key, the transmission may be immediately effected.

The private print job key of the provided print job key pair may be deleted on the computer device 402 after a receipt by the mobile user terminal 458, in particular, immediately after receipt of the confirmation message. As described above, in variants of the application the optional deletion may also be time-dependent.

Figure 5:
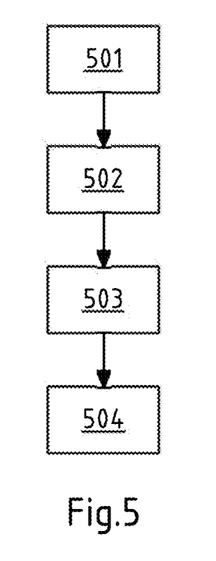
FIG. 5 is a diagram of an embodiment of a method according to the present application.

FIG. 5 shows a diagram of an embodiment of a method according to the present application for operating a printing system (cf. e.g. FIG. 4), at least for operating a printing server (cf. e.g. FIGS. 2, 4).

In a first step 501, an obtaining, by the printing server, of at least one print job encrypted with a public print job key of a print job key pair occurs from a computer device connectable to the communication network (as previously described).

In a (in particular temporarily downstream) step 502, an obtaining, by the printing server, of at least one private print job key of the print job key pair encrypted with a public printing device key of a printing device key pair occurs from a mobile user terminal (as previously described). The printing device key pair is (uniquely system-wide) associated with the printing device.

In step 503, a transmitting, by the printing server, of at least the received encrypted print job occurs to the printing device for printing of the print job by the printing device (as previously described).

In step 504, a transmitting, by the printing server, of at least the received encrypted private print job key occurs to the printing device (as previously described).

In particular, steps 503 and 504 can be carried out at least partially in parallel and/or said data can be transmitted in one data set (in one or more data packets). However, as has been described, a time offset can also be provided, in particular if the print job is not sent until a request message is received.

Figure 6:
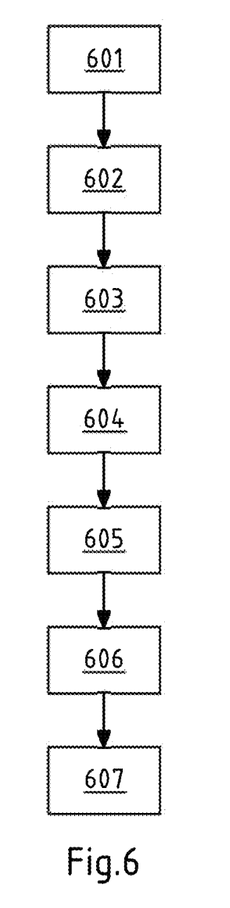
FIG. 6 is a diagram of a further embodiment of a method according to the present application.

FIG. 6 shows a diagram of a further embodiment for operating a printing system (cf. e.g. FIG. 4), at least for operating a printing device (cf. e.g. FIGS. 3, 4).

In a first step 601, a providing, by the printing device, of a printing device key pair comprising a private printing device key and a public printing device key occurs (as previously described).

In step 602, a storing occurs, by the printing device, of the private printing device key of the provided printing device key pair in a data memory of the printing device and, in particular, provides the public printing device key of the provided printing device key pair to the printing device such that the mobile user terminal can obtain the public printing device key (only) at the printing device (as previously described).

Further, in step 603, obtaining occurs, by the printing device, of a private print job key of a print job key pair encrypted with the provided public printing device key from a mobile user terminal via the printing server (as has already been described).

In the next step 604, an obtaining may occur, by the printing device, of a print job encrypted with a public print job key of a print job key pair may be obtained from a printing server (as described earlier).

Then, in step 605, a decrypting occurs, by the printing device, of the received encrypted private print job key with the stored private printing device key of the printing device key pair (as previously described). Subsequently, in step 606, a decrypting occurs, by the printing device, of the received encrypted print job with the decrypted private print job key (as described earlier).

Optionally, a request message can be sent first after step 605. In response to this, the print job can then be received according to step 604. Then step 606 can follow.

In a further step 607, a printing can take place of the decrypted print job and the corresponding print data, respectively (as already been described).

Figure 7:
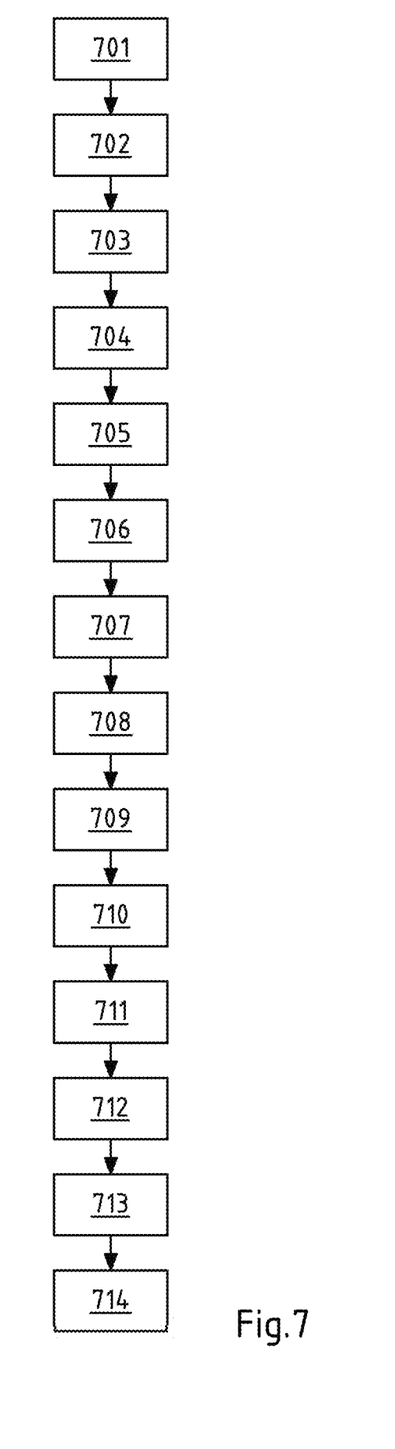
FIG. 7 is a diagram of a further embodiment of a method according to the present application.

Preferably, the methods according to FIGS. 5 and 6 can be combined with each other. This is explained below by way of example with the help of a particularly preferred embodiment in FIG. 7. FIG. 7 shows a diagram of a further embodiment of a method for operating a printing system (cf. e.g. FIG. 4).

In a first step 701, a print job can be created by the computer device 402 operated by an authorised user having a mobile user terminal 458. If the creation of a print job is detected (i.e., in particular, a print request based on a corresponding user input), an (asynchronous) print job key pair for this print job can be generated in step 702, which is valid only for this print job.

In step 703, this print job can then be encrypted with the public print job key of the generated print job key pair. In particular, in parallel, the private print job key may be displayed in step 704 in the form of an optical print job code by an optical display 454 of the computer device 402.

In step 705, a sending, by the computer device, may take place of encrypted print job may be. In particular, a print job data set may be sent containing the encrypted print job, a print identifier (for example, formed by a user identifier and a timestamp e.g. of print job creation) and a printing device identifier and/or printing device address of the printing device to be used for printing the print job respectively selected by the user from in particular a plurality of available printing devices. This step comprises, in particular, obtaining the encrypted print job, preferably the described print job data set, by the printing server 406.

In step 706 (which can be executed at least partially in parallel with step 705), a detecting of the displayed print job code may take place. The print job code may preferably contain said private print job key and, in particular, a further print identifier (for example, formed by user identifier and timestamp e.g. of print job creation) and preferably a printing device identifier and/or printing device address to be used for printing the print job or selected by the user from in particular a plurality of available printing devices. Preferably, the first print identifier and the further print identifier can be identical and, in particular, uniquely assigned to the print job.

The data (private print job key, print identifier and printing device identifier and/or printing device address) extracted, in particular, from the print job code may be stored in a data memory of the mobile user terminal 458 (step 707).

Said private print job key may be deleted after a specific period of time has elapsed (e.g., after 30 s after the start of the visual display of the print job code) and/or after a receipt of a confirmation message (sent by the mobile user terminal 458) on the computer device 402.

The user, together with his or her mobile user terminal 458, may move from the computer device 402 to the printing device 408 (typically) located remotely from the computer device 402 after scanning the print job code. For example, the printing device 408 may be located in a different room than the computer device 402 or at least significantly distant (greater than 5 m, in particular, greater than 10 m) from the computer device 402.

At the printing device 408, in step 708, the printing device code 448 can be detected by this mobile user terminal 458 (in particular, by the authorised user), in particular, scanned by means of the camera. The printing device code contains at least the public printing device key of an (asynchronous) printing device key pair uniquely assigned to the printing device 408, and optionally the printing device identifier and/or the printing device address of the printing device 408.

It should be noted that the printing device key pair of a printing device 408 can be regularly updated, i.e. in particular, a new printing device key pair can be generated.

In step 708, an encrypting may occur of the stored private print job key with the received public printing device key by the print application 466 and the mobile user terminal 458, respectively.

Prior to this step, it can optionally compared whether the printing device identifier and/or printing device address detected at the printing device matches the printing device identifier and/or the printing device address which has been stored with the private print job key. If this is not the case, an appropriate indication may be provided to the user via an interface of the mobile terminal 458. If a match is found in the optional comparison, the stored private print job key may be encrypted with the received public printing device key in step 708.

In step 709, the encrypted private print job key may be transmitted. Preferably, a key data set comprising the encrypted print job key, the further print identifier and, in particular, the printing device identifier and/or the printing device address may be transmitted. In particular, step 709 comprises obtaining, by the printing server 406, the encrypted private print job key, in particular said key data set. In variants of the application, the print job key and print identifier may be encrypted together, as has been explained.

In particular, after receiving said data, it may be determined immediately thereafter in step 710 whether an associated print job is stored in the data memory 434 of the printing server 406. In particular, the received further print identifier may be compared with all stored first print identifiers of the stored print jobs. As has been described, the key data set may also be forwarded (directly) to the printing device 408 and the determination may only be made upon receipt of a pre-described request message.

If a correspondence, in the present embodiment an identity, is detected between the received further print identifier and a stored first print identifier, the encrypted print job, preferably the print job data set, stored for this first print identifier and the received encrypted private print job key, in particular, the corresponding key data set, can be transmitted (together) (step 711).

In particular, in the present example, a transmitting occurs of the printing device 408 depending on the printing device identifier and/or the printing device address. The step 711 comprises at least obtaining, by the printing device 408, the obtained encrypted print job and the encrypted private print job key.

In step 712, a decrypting, by the printing device 408, occurs of the private print job key by using the private printing device key of the printing device 408.

Subsequently, in step 713, this decrypted private print job key is used by the printing device 408 to decrypt the associated print job.

Then, in step 714, the decrypted print job can be printed. The authorised user at the printing device can receive the printed document. Secure printing can be guaranteed.

The following is a brief description of the registration process: As has already been described, in this day and age it can be assumed that smartphones or similar mobile user terminals are widely available. According to the application, it has been recognised that it therefore makes sense to make the infrastructure required for a "signature card approach" superfluous by using mobile user terminals.

The aim of the application is furthermore to achieve a user-related encryption of print outputs. Instead of using an actual personal key, however, the approach according to the application is based in particular on a so-called session key pair, i.e. it is an (asynchronous) key pair that can preferably be used exclusively for this one printing process. Thus, the key pair is (inherently) person-related (it is only used by the printing and authorised person at that moment, so it is uniquely assigned to this person), and furthermore also device-related (because it is only valid for the process for the device coming into use for printing (i.e. the selected printing device)) and also print job-related, because a new key can be generated for each print job. This significantly increases security compared to the prior art.

The preferred printing sequence and the method, respectively, according to the application can be divided into four phases, wherein the individual phases are independently inventive:

1. Job session key pair generation (and print job key pair generation, respectively, in particular by the computer device) and transmission of the job session private key (and print job private key, respectively) to a mobile user terminal by the user who created and is authorised, respectively, to create the print job.
2. Encrypting of the job (and print job, respectively) with the job session public key and transmission of the encrypted print job to the printing server.
3. Transmission of the job session private key from the mobile user terminal to the printer using a printer session key pair consisting of the printer session private key and printer session public key.
4. Transmission of the print job encrypted with the job session public key from the printing server to the terminal or printing device and decryption of the encrypted print job with the job session private key on the printing device.

Phase 1: Key Transmission

As soon as a document is to be printed, the workstation and computer device, respectively, can generate a new key pair, in particular consisting of job session private key and job session public key (as has been described), for the printing process and job, respectively.

The job session private key can be encoded as a 2D barcode and displayed as an image on the computer device screen. A print application on the mobile user terminal can copy the key data to a secure memory on the user terminal using the camera.

Phase 2: Encryption of the Print Job and Transmission to the Server

As soon as the key is copied (a pre-written confirmation can be made, for example by the user), the print job can be encrypted with the job session public key and transmitted to the printing server. There it can be stored as it is, i.e. encrypted with the job session public key.

Phase 3: Transferring the Job Session Private Key

The user moves from the computer device to the printer and can photograph the device session public key with the print application. With this key, the job session private key can now be encrypted and sent via the printing server to the printer. There it can be decrypted again with the help of the device session private key so that it is now available for decrypting print jobs.

Phase 4: Sending the Job and Decryption

Now that the private key for decrypting the job is on the printer, the print job can be sent to the machine and decrypted again there using that very key. In particular, a pre-written request message and a corresponding response can be sent for this purpose.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of operating a printing system comprising at least one printing server and at least one printing device communicatively connectable to the printing server, comprising:
    obtaining, by the printing server, a print job encrypted with a public print job key of a print job key pair from a computer device communicatively connectable to the printing server,
    receiving, by the printing server, a private print job key of the print job key pair encrypted with a public printing device key of a printing device key pair from a mobile user terminal,
    wherein the printing device key pair is associated with the printing device,
    transmitting, by the printing server, the received encrypted private print job key to the printing device, and
    transmitting, by the printing server, the received encrypted print job to the printing device for printing of the print job by the printing device.

2. The method of claim 1, wherein
the private printing device key of the printing device key pair is stored in a data memory of the printing device, the method further comprising:
    decrypting, by the printing device, the obtained encrypted private print job key with the stored private printing device key of the printing device key pair, and
    decrypting, by the printing device, the received encrypted print job with the decrypted private print job key.

3. The method of claim 2, wherein the method comprises:
    providing, by the computer device, the print job key pair, in particular upon a creation of the print job,
    encrypting the print job with the public print job key of the provided print job key pair,
    transmitting, by the computer device, the encrypted print job to the printing server, and
    providing, by the computer device, the private print job key of the provided print job key pair such that the mobile user terminal can obtain the private print job key at the computer device.

4. The method of claim 3, wherein
providing, by the computer device, the private print job key of the provided print job key pair comprises displaying an optical print job code by an optical display of the computer device,
wherein the optical print job code contains the private print job key.

5. The method of claim 4, wherein
the private print job key of the provided print job key pair on the computer device is deleted after a receipt by the mobile user terminal.

6. The method of claim 1, wherein
the providing the print job key pair comprises generating a new print job key pair for each created print job.

7. The method of claim 1, wherein the method comprises:
    providing, by the printing device, the public printing device key of the provided printing device key pair such that the mobile user terminal can obtain the public printing device key at the printing device, and
    storing the private printing device key of the provided printing device key pair in a data memory of the printing device.

8. The method of claim 7, wherein
the providing, by the printing device, of the public printing device key of the provided printing device key pair comprises displaying an optical printing device code,
wherein the optical printing device code contains the public printing device key.

9. The method of claim 1, wherein
the obtaining, by the printing server, of the encrypted print job comprises obtaining a first print identifier, and
obtaining, by the printing server, a further print identifier, wherein at least the transmitting of the received encrypted print job to the printing device is based on the first print identifier and the further print identifier.

10. The method of claim 9, wherein the method comprises:
    storing, by the printing server, the received encrypted print job together with the received first print identifier in a data memory of the printing server.

11. The method of claim 10, wherein the method comprises:
    comparing a received further print identifier with the at least one stored first print identifier, and
    transmitting, when a correspondence between the received further print identifier and a stored first print identifier is determined in the comparing step, at least the stored encrypted print job with the first print identifier corresponding to the received further print identifier to the printing device.

12. A printing server for a printing system, the printing server comprising a processor and a memory, the memory storing program instructions that, when executed by the processor, cause the printing server to:
- receive a print job encrypted with a public print job key of a print job key pair from a computer device,
- obtain a private print job key of the print job key pair encrypted with a public printing device key of a printing device key pair from a mobile user terminal,
- wherein the printing device key pair is associated with a printing device,
- transmit the received encrypted private print job key to the printing device, and
- transmit the received encrypted print job to the printing device for printing of the print job by the printing device.

13. A printing device for a printing system, comprising
- at least one key pair providing unit configured to provide a printing device key pair comprising a private printing device key and a public printing device key,
- at least one data memory for storing the private printing device key of the provided printing device key pair,
- wherein the at least one key pair providing unit is configured to provide the public printing device key of the provided printing device key pair such that the mobile user terminal can obtain the public printing device key at the printing device,
- wherein the printing device is configured to:
  - receive a print job encrypted with a public print job key of a print job key pair from a printing server,
  - receive a private print job key of a print job key pair encrypted with the provided public printing device key from a mobile user terminal via the printing server,
  - decrypt the received encrypted private print job key with the stored private printing device key of the printing device key pair, and
  - decrypt the received encrypted print job with the decrypted private print job key.

14. A printing system, comprising:
- at least one printing server of claim 12, and
- at least one printing device communicatively connectable to the printing server.

15. A non-transitory, machine-readable storage medium having stored thereon a printing application in the form of a computer program installable on a mobile user terminal with computer code executable by a processor of the mobile user terminal, the printing application configured to cause the mobile user terminal to:
- receive a private print job key of a print job key pair provided by a computer device, wherein a print job is encryptable with a public print job key of the print job key pair by the computer device,
- store the received private print job key in a data memory of the mobile user terminal,
- receive a public printing device key of a printing device key pair provided by a printing device at the printing device,
- encrypt the stored private print job key with the received public printing device key, and
- cause a transmitting of the encrypted private print job key by the mobile user terminal.

* * * * *